United States Patent [19]
Landtwing et al.

[11] Patent Number: 5,053,601
[45] Date of Patent: Oct. 1, 1991

[54] PROCESS AND APPARATUS FOR PRODUCING WELDED STAMPED PARTS

[75] Inventors: Josef Landtwing, Zug; Waldemar Hellwig, Arbon, both of Switzerland

[73] Assignee: Bruderer AG, Frasnacht-Arbon, Switzerland

[21] Appl. No.: 352,747

[22] Filed: May 16, 1989

[30] Foreign Application Priority Data

May 27, 1988 [CH] Switzerland .................... 2023/88

[51] Int. Cl.⁵ ............................................ B23K 26/00
[52] U.S. Cl. ........................ 219/121.63; 219/121.45; 219/121.64; 219/121.85
[58] Field of Search .............. 219/121.63, 121.64, 219/121.45, 121.46, 121.6, 121.85

[56] References Cited

U.S. PATENT DOCUMENTS 3,989,778 11/1976 Osborne .................. 219/121.77 X

FOREIGN PATENT DOCUMENTS

| 2435981 | 4/1980 | France. | |
| 0036962 | 3/1980 | Japan | 219/121.64 |
| 61-135348 | 6/1986 | Japan. | |
| 0193793 | 8/1986 | Japan | 219/121.64 |

*Primary Examiner*—C. L. Albritton
*Attorney, Agent, or Firm*—Ladas & Parry

[57] ABSTRACT

A process for producing at least two joined-together stamped parts stamps the two stamped parts in stamping operation of a stamping tool in a stamping press that retains the two stamped parts and welds the two stamped parts together at least at one location in the course of the stamping operation with the beam of a laser.

19 Claims, 3 Drawing Sheets

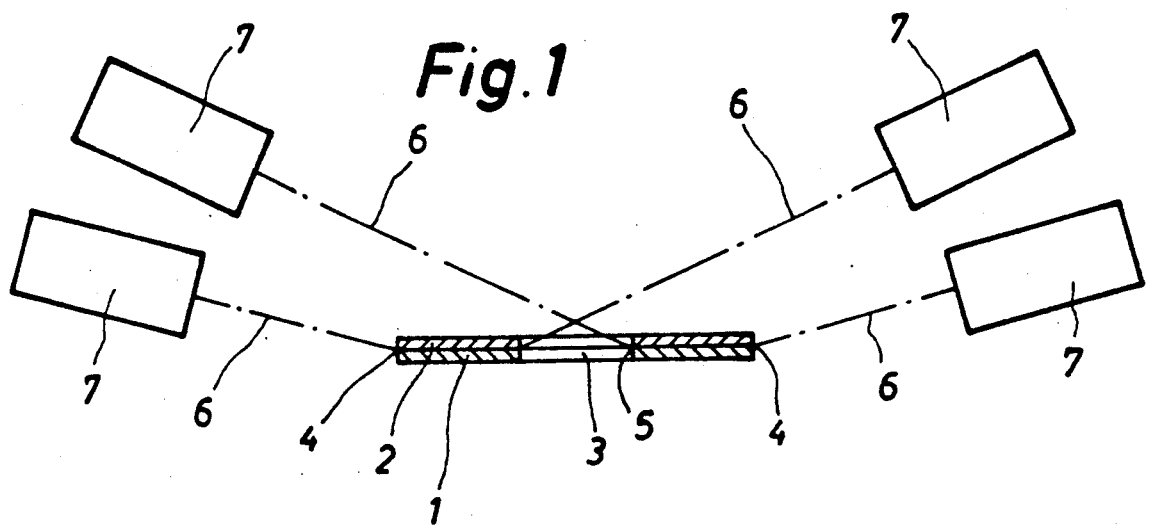
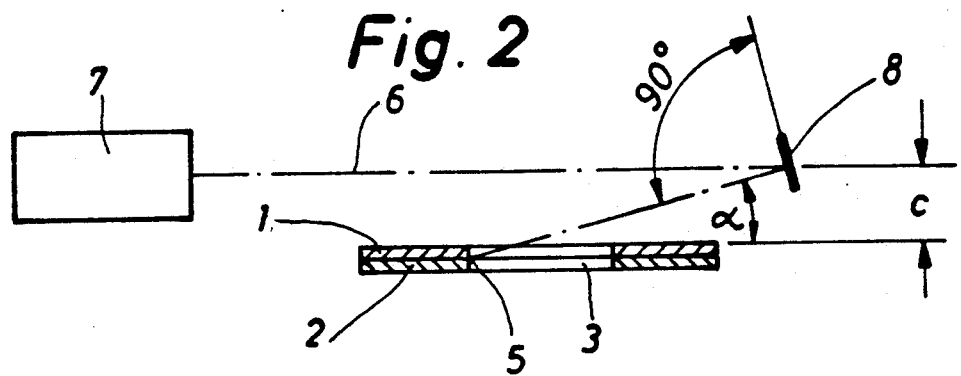
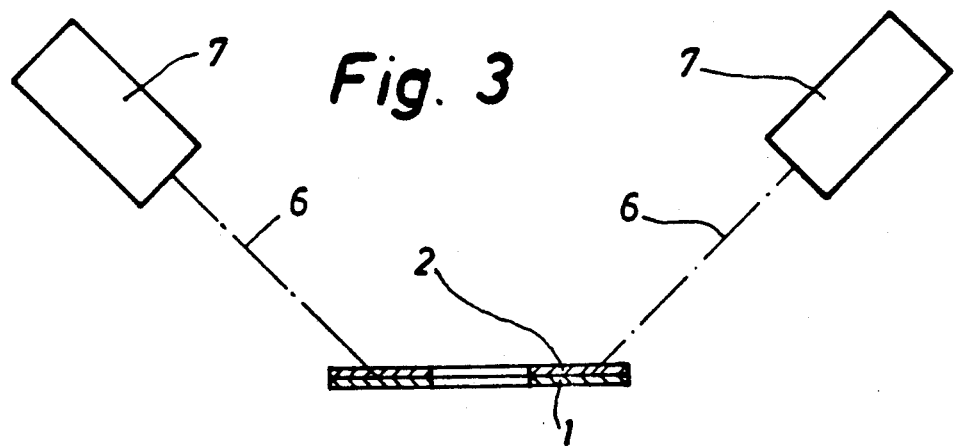
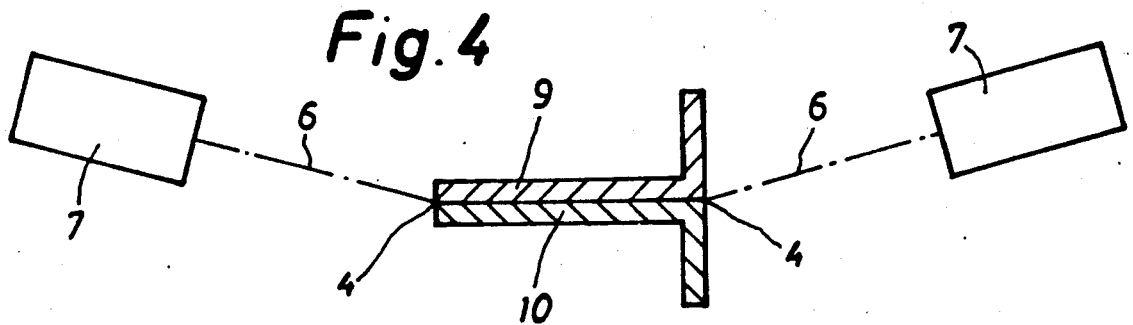

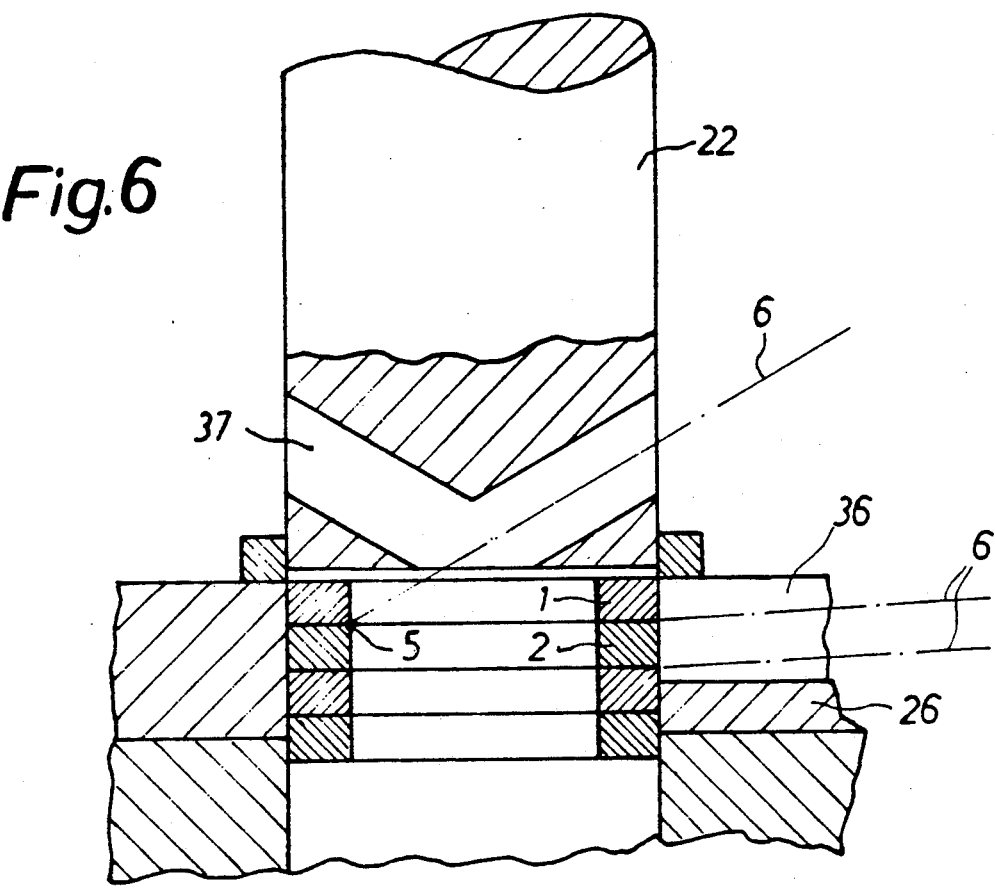
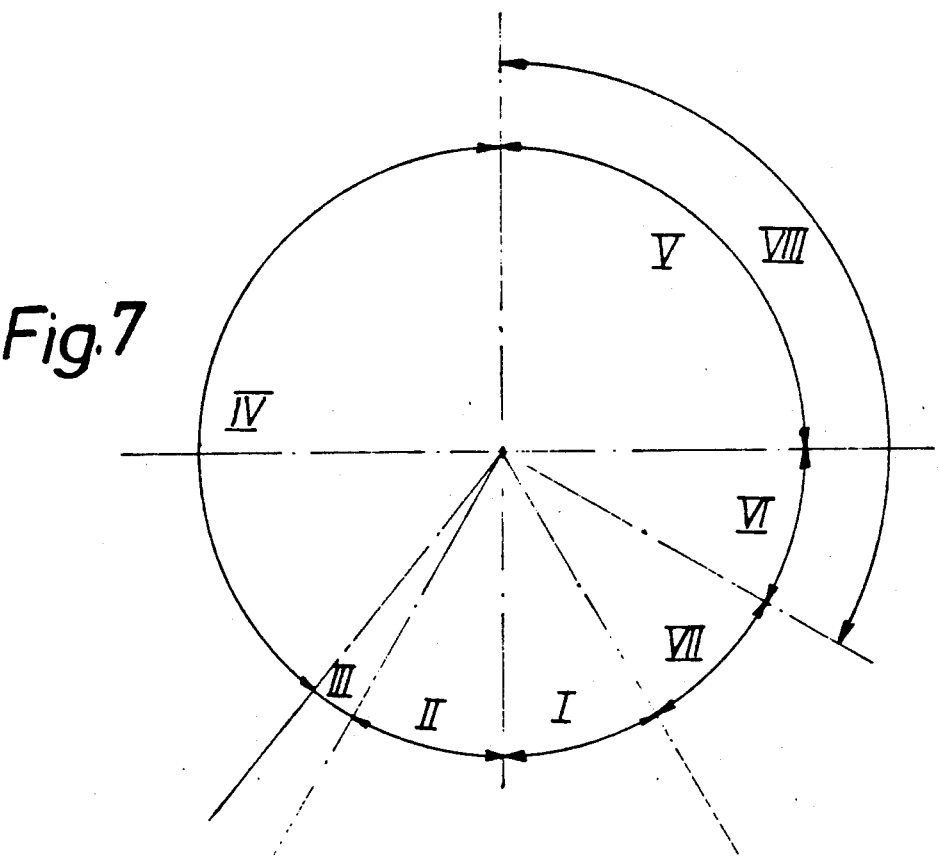

PROCESS AND APPARATUS FOR PRODUCING WELDED STAMPED PARTS

The present invention relates to a process for producing at least two joined together stamped parts, and an apparatus for carrying out the process.

A known manner of joining two materials within a stamping machine is contact welding (e.g. the CONTRAP system). Hereby pre-stamped contacts are joined to parts separated from a profiled wire by means of resistance welding. This welding requires relatively much energy. The stamping cycle is limited to about 400 strokes per minute.

A process of this kind is known by the term of FASTEC ®; it has been developed by KURODA PRECISION Industries, LTD. With this process single stamped parts can be joined together in a stamping tool. The joining occurs by means of recesses (depressions) or the like so that the stamped parts fit into one another by being pressed or clutched. This process is used particularly for producing stacks of sheets, for example, for rotors and stators. A process of this kind is known from the German Application 32 03 123.

In these processes all operations are carried out within a multi-staged operation die, comprising a plurality of single dies. The processes are disadvantageous because the average stamping speeds at 3 to 400 strokes per minute are regarded as being low;

the tool, which is required for producing such stamped parts, is complicated in design and expensive in production, and due to a locally limited joining of the stamped parts, they can deform so that they do not mate satisfactorily and, therefore, cannot be combined into a stack.

Furthermore, it is known that in a multistage operation die there is provided a modulus for feeding parts and one for joining the stamped part to the part fed by means of laser welding in addition to the moduli for stamping, punching, bending, etc..

A disadvantage of this process resides in that the multistage operation die is burdened with operations not related to the stamping process.

The object of the invention is to eliminate the aforestated disadvantages.

It is an object of the invention to create a process for producing at least two joined together stamped parts, providing that the stamped parts are joined undetachably, cohesion is substantially increased, and the precision of measurement of the stamped parts joined together is improved toward one another.

According to the invention, the object is achieved by means of the characterizing feature of claim 1.

The advantages to be achieved are essentially seen in that the stamping speed can be increased, and the effect of the joint upon the form of the stamped parts can be reduced to a minimum.

In a preferred embodiment of the process, in which the stamped parts are combined into a stack, adjacent stamped parts in the stack are welded together in an area of the superposed edge.

The advantages resulting therefrom are seen in that the quality of the joint is improved, and the stacking in the stamping tool occurs in a precise superposed fashion, due to which separate known stackers drop out and the stamping cycle can be shortened.

An apparatus for carrying out the process is characterized by claim 9.

The advantages of the apparatus are seen in that the stamping tool is simplified and the stroke-frequency of the stamping press is increased.

Hereinafter the invention is illustrated in greater detail by means of the attached drawings:

FIGS. 1 to 4 are a diagrammatic representation of forms of application of the process according to the invention;

FIG. 6 shows on an enlarged scale a detail of the apparatus shown in FIG. 5; and FIG. 7 is a diagrammatic representation of the order of a work cycle in the production of stacks of sheets.

Figure 5:
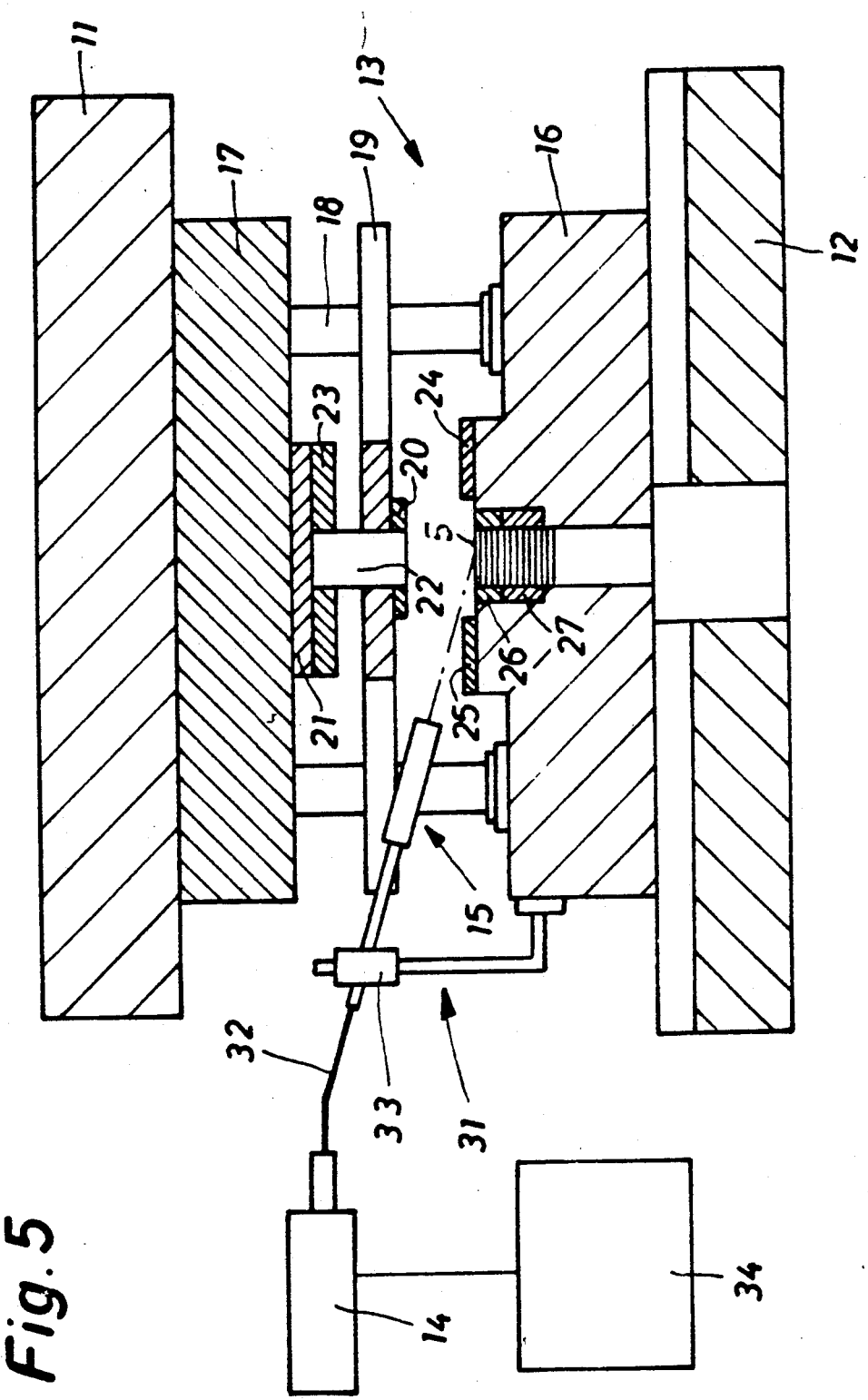
FIG. 5 is a diagrammatic representation of a specific embodiment of an apparatus according to the invention for producing stacks of sheets made from electric sheets.

In the process under discussion, the stamped parts are welded together within a stamping cycle by means of laser welding. The stamping cycle depends on the part to be stamped and, in the simplest case, it can consist of a single stamping operation. The succession of the stamping operation is predetermined by the stamping device, for example, by means of a shaft encoder coupled to the eccentric shaft of the stamping device. If two stamped parts are to be welded together, the welding occurs only in the second stamping operation, and the stamped parts must be in an off-position.

FIGS. 1 to 4 show various forms of application of the process according to the invention; herein the same reference numerals are used for characterizing like elements.

In the form of application, which is shown in FIG. 1, stamped parts 1 and 2 have a recess 3 and can be welded together at the outer edge 4 and/or at edges 5 formed by recess 3 by means of laser beams 6 from laser-sources 7.

Contrary to the form of application shown in FIG. 1, FIG. 2 shows a laser 6, which is directed via a reflection means 8, for example, a mirror, to the area to be welded.

FIG. 3 shows a form of application in which a punctiform welding of stamped parts 1 and 2 is carried out.

FIG. 4 shows a form of application providing that two angle sections 9 and 10 are welded together.

In this context it will be pointed out that the process in not limited to the forms of application outlined.

As FIG. 5 shows, an apparatus for carrying out the aforementioned process includes a stamping press comprising a slide 11 and a platen of a press 12, a stamping tool 13, and a laser device 14 having a focusing device 15.

The stamping tool 13 is mounted on a platen of the press 11 in a manner known pre se. The stamping tool 13 is developed in dependence on the part to be stamped and includes, as is well known, a lower part 16 of the tool, an upper part 17 of the tool, guide columns 18 for the upper part of the tool, which are mounted on the lower part of the tool, a holding plate 19 comprising a stripper 20, which is directed along the guide columns, a pressure plate 21, a die 22, and a die holding plate 23, which is mounted on the upper part 17 of the tool, and also guide plates 24, 25 for the material, which is in the form of a tape (not shown), and a matrix 26 mounted in the lower part 16 of the tool.

An arrangement 31 for holding and adjusting the focusing device 15 of the laser device is disposed on the platen of the press 12. The focusing device 15 is connected to the laser device 14 via a light-guiding cable 32. Advantageously, the laser device 14 is a pulsed laser, the radiation source of which is a glass rod or a YAG rod. In order to adjust the focusing device 15, arrangement 31 is provided with an adjusting member 33. A laser, including a radiation divider, for welding in several locations, as, for example, it is shown in FIG. 2, is foreseen in the example described above. However, it is also possible to provide two welding apparatus 14, 15, which lie opposite each other, and are held, respectively, by arrangement 31.

An observation device, which is coupled to the focusing device, is provided for adjusting a laser beam. In addition to the heretofore described separate arrangement of laser device 14 and focusing device 15, it is also possible to use a laser device having an integrated focusing device and observation device.

The welding apparatus 14, 15 are controlled by a control instrument 34. The control instrument contains a shaft encoder, which is mechanically connected to the eccentric shaft of the stamping press, a scanner, which cooperates with the shaft encoder, and a control circuit, which receives signals from the scanner and transmits control signals for carrying out an appropriate function within an operation.

Underneath matrix 26 there is mounted a brake 27, with which separate stamped parts can be delivered as a stack.

As FIG. 6 shows, recesses 37 are provided in the matrix 26 and, consequently, also in the lower part of the tool, and holes 36 are provided in the die 22 in order to direct the laser beam 6 onto the stamped parts 1, 2 to be welded together.

A preferred embodiment of the process concerns the production of stacks of sheets from electric sheets, for example, for rotors, stators and transformers. FIG. 7 shows the work cycle in this process in dependence on the rotation of the eccentric shafts.

As FIG. 7 shows, the cutting operation I ends when the bottom dead center B.D.C. is reached. Subsequently there occurs an extension II of the die. In the area of the bottom dead center B.D.C. the laser beam 6 can be directed to the outer or inner edge 4 or 5 when the die 22 is provided with oblong holes 36,37. In the case a die 22 is not provided with oblong holes, a laser beam 6 is used at III. Subsequently a welding operation IV is carried out; it ends when the upper dead center U.D.C. is reached. Tape feed V begins immediately after the upper dead center; it is followed by a clamping operation VI. During the feeding of the tape V and the clamping VI there occurs a twisting of the stack VIII. After the clamping operation VI a cutting operation I is prepared by adjustment VII of a pilot pin, whereupon a new cycle begins.

It is apparent from the above description that the process according to the invention offers a special advantage of carrying out a welding operation at the bottom dead center and the upper dead center.

Thus, one can produce stacks of sheets which with regard to quality greatly surpass those produced according to prior art processes, and which also have much better operation characteristics and electrical properties; one would also have to pay special attention to the fact that work can be carried out at a high stamping speed, for example, 800 strokes per millimeter, and that the stamping tools undergo a substantial simplification.

It is claimed:

1. A process for producing at least two joined-together stamped parts, comprising:
   stamping at least two stamped parts in stamping operation of a stamping tool in a stamping press that retains the two stamped parts; and
   welding the two stamped parts together at least at one location in the course of the stamping operation with the beam of a laser, the one location where the two stamped parts are welded together being at their edges.

2. A process according to claim 1, wherein the location where the two stamped parts are welded together is at superposed surfaces thereof.

3. A process according to claim 1, wherein the two stamped parts are combined into a stack wherein adjacent parts in the stack have superposed edges, and further comprising another location of the welding, the one and another locations being at opposite sides of the two stamped parts.

4. An apparatus for carrying out the process according to claim 1, wherein the laser is a pulsed laser controlled in dependence on the stamping operation of the stamping press.

5. An apparatus to claim 4, wherein the laser is mounted on one of the stamping press and stamping tool.

6. An apparatus according to claim 4, and further comprising a focusing device for the laser beam fastened to the stamping tool, and a light-guiding cable connecting the laser and focusing device.

7. An apparatus according to claim 4, and further comprising a reflection device for the laser beam fastened to the stamping tool.

8. An apparatus according to claim 4, and further comprising arrangement means for holding the laser and for adjusting the laser beam.

9. A process according to claim 1, wherein the location where the two stamped parts are welded together is at superposed surfaces thereof.

10. A process according to claim 1, wherein the two stamped parts are combined into a stack wherein adjacent parts in the stack have superposed edges, and further comprising another location of the welding, the one and another locations being at opposite sides of the two stamped parts.

11. A process according to claim 2, wherein the two stamped parts are combined into a stack wherein adjacent parts in the stack have superposed edges, and further comprising another location of the welding, the one and another locations being at opposite sides of the two stamped parts.

12. A process according to claim 9, wherein the two stamped parts are combined into a stack wherein adjacent parts in the stack have superposed edges, and further comprising another location of the welding, the one and another locations being at opposite sides of the two stamped parts.

13. An apparatus according to claim 5, and further comprising a focusing device for the laser beam fastened to the stamping tool, and a light-guiding cable connecting the laser and focusing device.

14. An apparatus according to claim 5, and further comprising a reflection device for the laser beam fastened to the stamping tool.

15. An apparatus according to claim 6, and further comprising a reflection device for the laser beam fastened to the stamping tool.

16. An apparatus according to claim 13, and further comprising a reflection device for the laser beam fastened to the stamping tool.

17. An apparatus according to claim 5, and further comprising arrangement means for holding the laser and for adjusting the laser beam.

18. An apparatus according to claim 6, and further comprising arrangement means for holding the laser and for adjusting the laser beam.

19. An apparatus according to claim 16, and further comprising arrangement means for holding the laser and for adjusting the laser beam.

* * * * *